US012767357B2

(12) United States Patent
Mukae

(10) Patent No.: US 12,767,357 B2
(45) Date of Patent: Oct. 20, 2026

(54) FLIGHT POSITION DERIVATION METHOD, FLYING OBJECT TRACKING SYSTEM, AND FLYING OBJECT HANDLING SYSTEM

(71) Applicant: Mitsubishi Electric Corporation, Tokyo (JP)

(72) Inventor: Hisayuki Mukae, Tokyo (JP)

(73) Assignee: MITSUBISHI ELECTRIC CORPORATION, Tokyo (JP)

(*) Notice: Subject to any disclaimer, the term of this patent is extended or adjusted under 35 U.S.C. 154(b) by 406 days.

(21) Appl. No.: 18/275,213

(22) PCT Filed: Feb. 9, 2022

(86) PCT No.: PCT/JP2022/005082
§ 371 (c)(1),
(2) Date: Aug. 1, 2023

(87) PCT Pub. No.: WO2022/176733
PCT Pub. Date: Aug. 25, 2022

(65) Prior Publication Data

US 2024/0101279 A1 Mar. 28, 2024

(30) Foreign Application Priority Data

Feb. 19, 2021 (JP) ................................ 2021-024860

(51) Int. Cl.
*B64G 1/10* (2006.01)

(52) U.S. Cl.
CPC ......... *B64G 1/1021* (2013.01); *B64G 1/1007* (2013.01); *B64G 1/1085* (2013.01)

(58) Field of Classification Search
CPC .. B64G 1/1007; B64G 1/1021; B64G 1/1085; B64G 3/00; B64G 1/10; C08B 1/003;
(Continued)

(56) References Cited

U.S. PATENT DOCUMENTS 7,875,837 B1 * 1/2011 Szabo ........................ F41G 7/30 342/67
8,610,041 B1 * 12/2013 Boardman ............ G01S 13/883 342/61
(Continued)

FOREIGN PATENT DOCUMENTS

JP 2011052999 A * 3/2011
JP 4946398 B2 6/2012
(Continued)

OTHER PUBLICATIONS

International Search Report and Written Opinion mailed on Apr. 12, 2022, received for PCT Application PCT/JP2022/005082, filed on Feb. 9, 2022, 11 pages including English Translation.
(Continued)

*Primary Examiner* — Angela Y Ortiz
*Assistant Examiner* — Aarron E Santos
(74) *Attorney, Agent, or Firm* — XSENSUS LLP

(57) ABSTRACT

A flying object (109) flies on the earth's limb. Three surveillance satellites (120) monitor the earth's limb from different latitudes than each other at the time of interest and transmit three sets of monitoring data. A ground system (130) receives the three sets of monitoring data, calculates three line-of-sight directions from the three surveillance satellites to the flying object at the time of interest based on the three sets of monitoring data, and calculates flying object coordinate values indicating the position of the flying object at the time of interest based on the three line-of-sight directions.

12 Claims, 10 Drawing Sheets

(58) Field of Classification Search
CPC ......... C08J 2301/02; C08J 5/18; C08K 13/02; C08K 2003/2296; C08K 3/22; C08L 1/02; C08L 2201/06; F41H 11/02
See application file for complete search history.

(56) References Cited

U.S. PATENT DOCUMENTS

| | | | | |
|---|---|---|---|---|
| 9,250,043 | B1 * | 2/2016 | Block | G01S 7/003 |
| 2010/0038490 | A1 * | 2/2010 | Hofschuster | B64G 3/00<br>244/158.1 |
| 2018/0106898 | A1 | 4/2018 | Baskaran et al. | |

FOREIGN PATENT DOCUMENTS

| | | | |
|---|---|---|---|
| RU | 2629922 | C1 * | 9/2017 |
| WO | 2020261481 | A1 | 12/2020 |

OTHER PUBLICATIONS

Office Action issued Dec. 26, 2023 in Japanese Patent Application No. 2023-500772 and English Translation thereof.

* cited by examiner

101:FLYING OBJECT TRACKING SYSTEM

FLIGHT POSITION DERIVATION METHOD, FLYING OBJECT TRACKING SYSTEM, AND FLYING OBJECT HANDLING SYSTEM

CROSS-REFERENCE TO RELATED APPLICATIONS

The present application is based on PCT filing PCT/JP2022/005082, filed Feb. 9, 2022, which claims priority from JP 2021-024860, filed Feb. 19, 2021, the entire contents of each are incorporated herein by reference.

TECHNICAL FIELD

The present disclosure relates to technology for tracking a flight trajectory of a flying object.

BACKGROUND ART

There are flying object handling systems that presume a ballistic flight of a flying object.

Such a flying object handling system detects plume at the time of launch with an infrared observation device installed aboard a geostationary orbit satellite, predicts a landing location based on movement information in an early stage of flight, and handles the flying object with a handling system.

Upon launch, extremely hot gas spreads over a large area. So, the flying object can be detected even by monitoring from a geostationary orbit.

However, flying objects called Hypersonic Glide Vehicles (HGVs) have recently emerged and become new threats. This flying object intermittently injects in the course of flight to change its flight path.

In order to track a flying object which has ceased injection, it is necessary to detect the temperature of the body of the flying object. For that end, high-resolution and high-sensitivity infrared monitoring is required; handling is not possible via monitoring by conventional geostationary satellites.

Thus, there have been ongoing studies on a system to monitor for a flying object by means of a low orbit satellite constellation from a far closer distance than a geostationary orbit.

There is also a demand for a mechanism to perform monitoring at all times with a low orbit satellite constellation and immediately deliver information to a handling asset after detection of the launch of a flying object.

A low orbit satellite constellation is a satellite constellation consisting of a low orbit satellite group.

The low orbit satellite group includes one or more low orbit satellites.

A low orbit satellite is an artificial satellite that flies in a low orbit like a LEO.

LEO is an abbreviation of Low Earth Orbit.

Patent Literature 1 discloses a surveillance satellite for thoroughly monitoring regions at a certain latitude on the entire spherical surface of the earth while orbiting in a low orbit.

CITATION LIST

Patent Literature

Patent Literature 1: JP 4946398

SUMMARY OF INVENTION

Technical Problem

An object of the present disclosure is to enable tracking of the flight trajectory of a flying object.

Solution to Problem

A flight position derivation method of the present disclosure, wherein

- a first surveillance satellite monitors an earth's limb on which a flying object is flying from a first latitude at a time of interest while orbiting around the earth to acquire first monitoring data, and transmits the first monitoring data,
- a second surveillance satellite monitors the earth's limb at the time of interest from a second latitude while orbiting around the earth to acquire second monitoring data, and transmits the second monitoring data, and
- a third surveillance satellite monitors the earth's limb at the time of interest from a third latitude while orbiting around the earth to acquire third monitoring data, and transmits the third monitoring data, and
- a ground system
  - receives the first monitoring data, the second monitoring data, and the third monitoring data,
  - calculates a first line-of-sight direction from the first surveillance satellite to the flying object at the time of interest based on the first monitoring data, calculates a second line-of-sight direction from the second surveillance satellite to the flying object at the time of interest based on the second monitoring data, and calculates a third line-of-sight direction from the third surveillance satellite to the flying object at the time of interest based on the third monitoring data, and
  - calculates flying object coordinate values indicating a position of the flying object at the time of interest based on the first line-of-sight direction, the second line-of-sight direction, and the third line-of-sight direction.

Advantageous Effects of Invention

According to the present disclosure, calculation of flying object coordinate values at each time becomes possible. Therefore, tracking of the flight trajectory of a flying object becomes possible.

DESCRIPTION OF EMBODIMENTS

Figure 1:
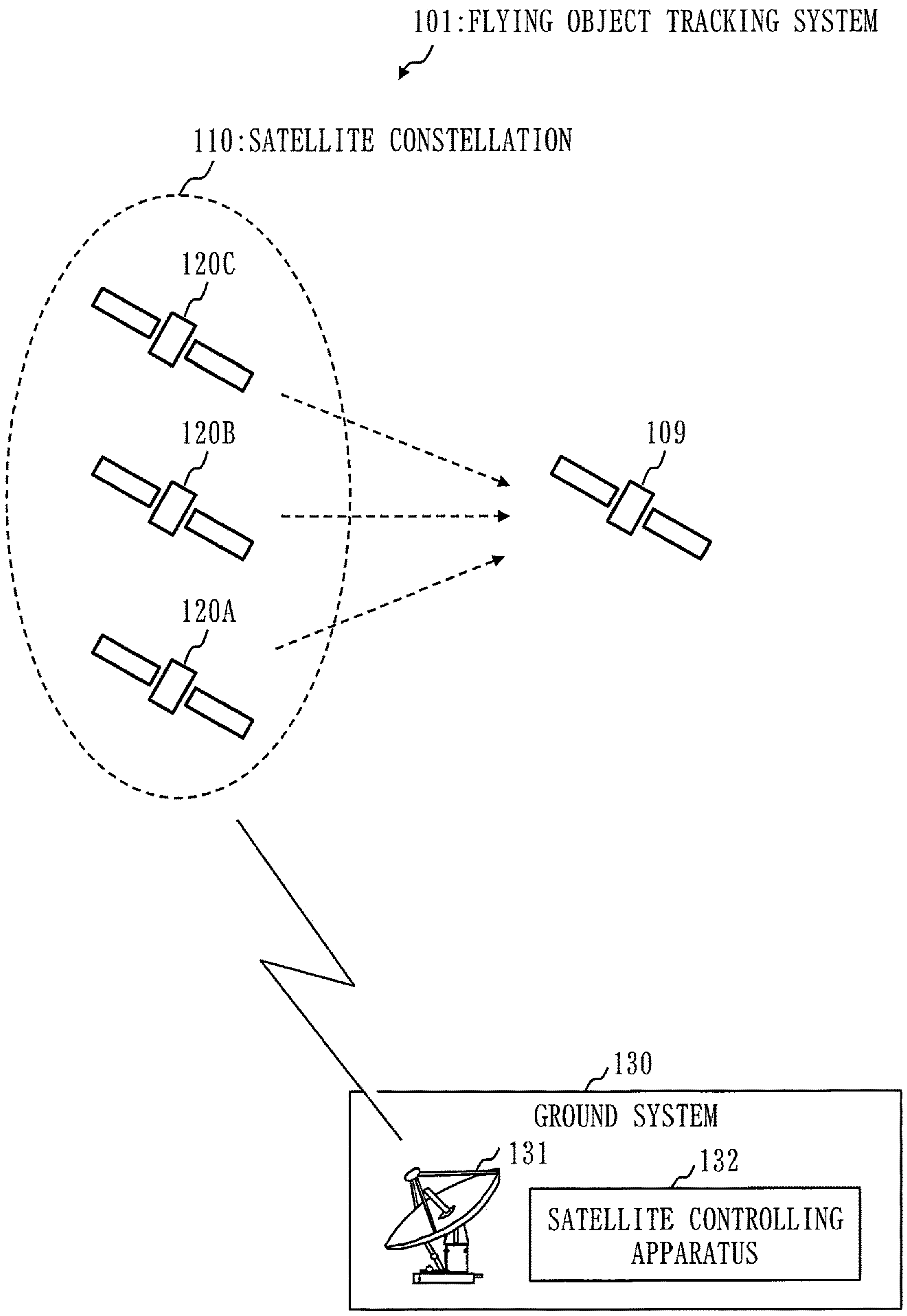
FIG. 1 is a configuration diagram of a flying object tracking system 101 in Embodiment 1.

In the embodiments and drawings, the same or corresponding elements are given the same reference characters. Description on an element with the same reference character as an already described element is omitted or simplified as appropriate.

Embodiment 1

A flying object tracking system 101 will be described based on FIGS. 1 to 3.

Description of Configuration

Based on FIG. 1, a configuration of the flying object tracking system 101 is described.

The flying object tracking system 101 is a system for tracking the flight trajectory of a flying object 109.

The flying object tracking system 101 includes a satellite constellation 110 and a ground system 130.

The satellite constellation 110 has three or more surveillance satellites 120 including a first surveillance satellite 120A, a second surveillance satellite 120B, and a third surveillance satellite 120C.

The surveillance satellites 120 are artificial satellites for monitoring the flying object 109.

Figure 2:
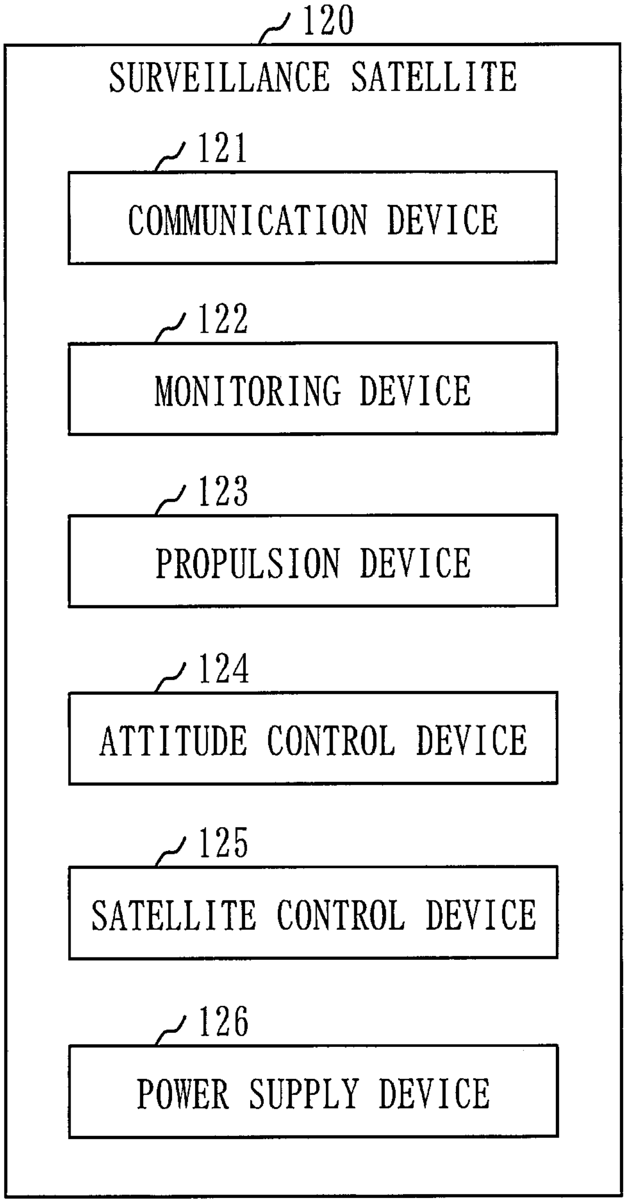
FIG. 2 is a configuration diagram of a surveillance satellite 120 in Embodiment 1.

Based on FIG. 2, the configuration of each surveillance satellite 120 is described.

The surveillance satellite 120 includes a communication device 121, a monitoring device 122, a propulsion device 123, an attitude control device 124, a satellite control device 125, and a power supply device 126.

The communication device 121 is a communication device for communicating with the ground system 130. For example, the communication device 121 receives various commands from the ground system 130. The communication device 121 also transmits monitoring data acquired by the monitoring device 122 to the ground system 130.

The monitoring device 122 is a device for monitoring the flying object 109 and generates monitoring data. Specifically, the monitoring device 122 is a monitoring device that utilizes infrared rays.

Monitoring data is data representing images containing the flying object 109 and indicates the position of the flying object 109 in a field of view (monitoring range) of the monitoring device 122.

Monitoring data may also include time information, position information, line-of-sight information, field-of-view information, and the like. Time information indicates the time at which monitoring was performed (time of monitoring). Position information indicates the coordinate values of the surveillance satellite 120.

Line-of-sight information indicates a line-of-sight direction of the monitoring device 122. Field-of-view information indicates the field of view of the monitoring device 122.

The propulsion device 123 is a device to provide thrust to the surveillance satellite 120 and changes the speeds of the surveillance satellite 120. Specifically, the propulsion device 123 is an electric propeller. For example, the propulsion device 123 can be an ion engine or a Hall thruster.

The attitude control device 124 is a device for controlling attitude elements such as attitude of the surveillance satellite 120 and angular speed of the surveillance satellite 120.

The attitude control device 124 changes the attitude elements in desired directions. Alternatively, the attitude control device 124 maintains the attitude elements in desired directions. The attitude control device 124 includes attitude sensors, actuators, and a controller. The attitude sensors can be a gyroscope, an earth sensor, a sun sensor, a star tracker, a thruster, a magnetic sensor, and the like. The actuators can be an attitude control thruster, a momentum wheel, a reaction wheel, a control moment gyro, and the like. The controller controls the actuators in accordance with measurement data from the attitude sensors or various commands from the ground system 130.

The attitude control device 124 can be used as a device for changing the field-of-view direction of the monitoring device 122 (a field-of-view direction changing device). The field-of-view direction of the monitoring device 122 corresponds to the line-of-sight direction of the monitoring device 122. A range centered at the line-of-sight direction of the monitoring device 122 (the field of view) defines the monitoring range.

The satellite control device 125 is a computer that controls the devices on the surveillance satellite 120, and includes a processing circuitry. For example, the satellite control device 125 controls the devices in accordance with various commands transmitted from the ground system 130.

The power supply device 126 includes a solar cell, a battery, an electric power control device, and the like and supplies electric power to the devices on the surveillance satellite 120.

Pointing functionality of the surveillance satellite 120 is described.

The surveillance satellite 120 has pointing functionality for making the line-of-sight direction pointed at the flying object 109.

For example, the surveillance satellite 120 includes a reaction wheel. A reaction wheel is a device for controlling the attitude of the surveillance satellite 120. Control of the attitude of the surveillance satellite 120 by the reaction wheel achieves body pointing.

For example, the surveillance satellite 120 includes a pointing mechanism. The pointing mechanism is a mechanism for changing the field-of-view direction of the monitoring device 122 (a field-of-view direction changing device). For the pointing mechanism, a drive mirror and the like are used, for example.

Returning to FIG. 1, the configuration of the ground system 130 is described.

The ground system 130 includes a communication device 131 and a satellite controlling apparatus 132.

The satellite controlling apparatus 132 is a computer with hardware such as a processing circuitry and an input/output interface. The input/output interface is connected with input devices and output devices. The satellite controlling apparatus 132 is connected to the communication device 131 via the input/output interface. The satellite controlling apparatus 132 generates various commands for each surveillance satellite 120 in order to control the satellite constellation 110. The satellite controlling apparatus 132 also analyzes monitoring data acquired from each surveillance satellite 120 and generates information on the flying object 109 (for example, position information).

The communication device 131 performs communications with each surveillance satellite 120. Specifically, the communication device 131 transmits various commands to each surveillance satellite 120. The communication device 131 also receives monitoring data transmitted from each surveillance satellite 120.

Processing circuitry included in the satellite controlling apparatus 132 and the satellite control device 125 respectively will be described.

The processing circuitry may be dedicated hardware or may be a processor that executes programs stored in memory.

In the processing circuitry, some of functions may be implemented in dedicated hardware and the remaining functions may be implemented in software or firmware. That is, the processing circuitry can be implemented in hardware, software, firmware, or combination thereof.

Dedicated hardware can be a single circuit, a composited circuit, a programmed processor, a parallel programmed processor, an ASIC, an FPGA, or combination thereof, for example.

ASIC is an abbreviation of Application Specific Integrated Circuit.

FPGA is an abbreviation of Field Programmable Gate Array.

Adjustment of satellite altitude and orbital inclination angle is described.

A relative angle representing a normal to the orbital plane of the surveillance satellite 120 as seen from the north pole side is established by correlation of the satellite altitude and the orbital inclination angle.

Under the altitude condition of maintaining the number of satellite orbits per day, making fine adjustment to an appropriate orbital inclination angle enables operation of the satellite constellation 110 with the relative angle between orbital planes maintained.

The satellite controlling apparatus 132 generates commands for controlling the altitude of each surveillance satellite 120. The satellite controlling apparatus 132 also generates commands for controlling the orbital inclination angle of each surveillance satellite 120. Then, the satellite controlling apparatus 132 transmits the commands to each surveillance satellite 120.

At each surveillance satellite 120, the satellite control device 125 adjusts each of the satellite altitude and the orbital inclination angle in accordance with these commands. Specifically, the satellite control device 125 controls the propulsion device 123 in accordance with the commands. Changing of the satellite speed by the propulsion device 123 can adjust the satellite altitude and the orbital inclination angle.

When a flying speed of the surveillance satellite 120 increases, the altitude of the surveillance satellite 120 increases. When the altitude of the surveillance satellite 120 increases, in turn a ground speed of the surveillance satellite 120 decreases.

When the flying speed of the surveillance satellite 120 decreases, the altitude of the surveillance satellite 120 decreases. When the altitude of the surveillance satellite 120 decreases, in turn the ground speed of the surveillance satellite 120 increases.

If the propulsion device 123 generates thrust in a direction orthogonal to the orbital plane at a point where the surveillance satellite 120 traverses above the equator (equinox), the orbital inclination angle can be fine-tuned effectively.

Description of Operation

A procedure of operation of the flying object tracking system 101 corresponds to a flight position derivation method.

Figure 3:
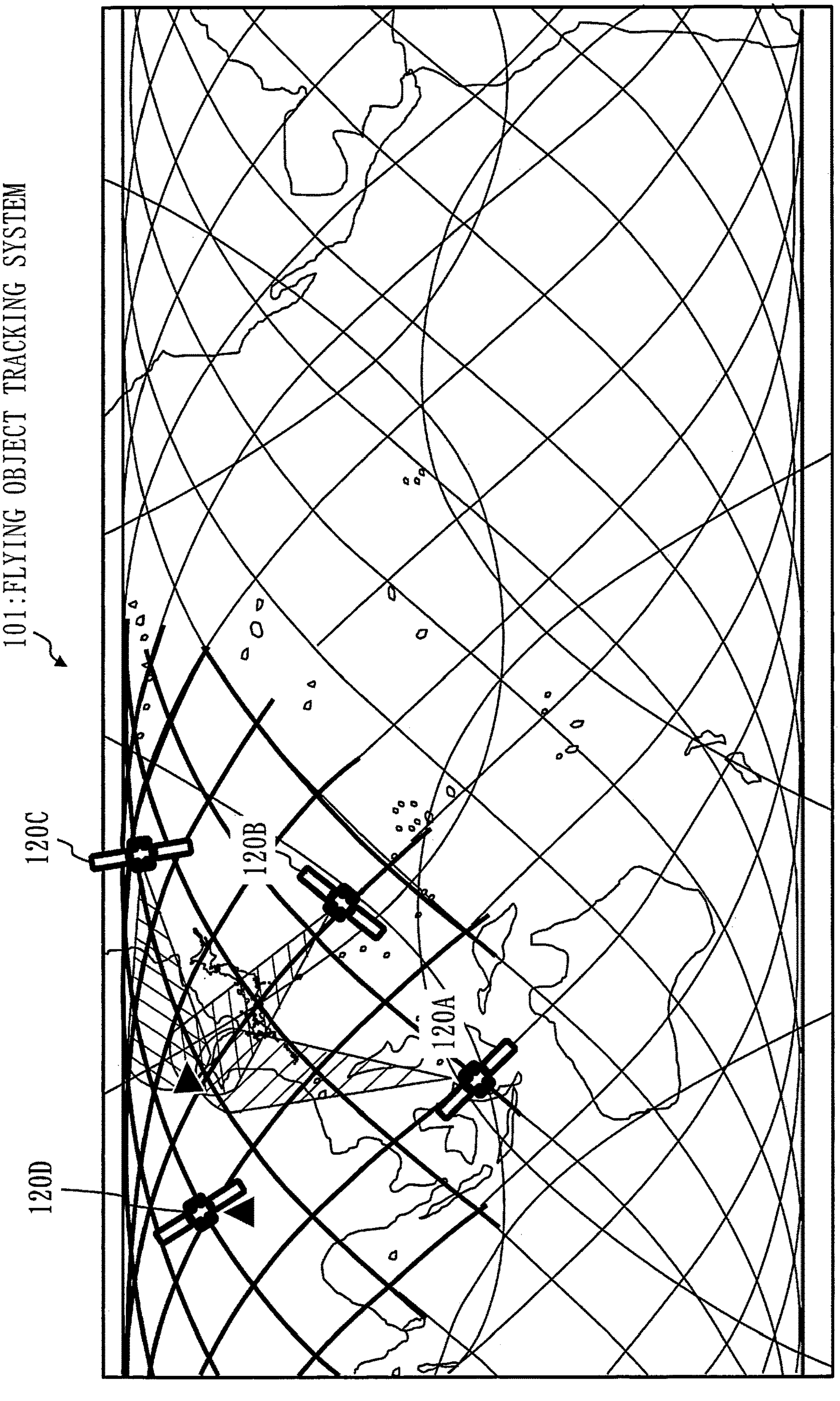
FIG. 3 shows monitoring by the flying object tracking system 101 in Embodiment 1.

Based on FIG. 3, the flight position derivation method is described.

The up-pointing black triangle represents the flying object 109 upon launch. The other black triangle represents the flying object 109 flying after the launch.

A surveillance satellite 120D is a surveillance satellite 120 included in the satellite constellation 110. The surveillance satellite 120D may be any of the first surveillance satellite 120A, the second surveillance satellite 120B, and the third surveillance satellite 120C, or may be another surveillance satellite 120. The surveillance satellite 120D looks down the launch point of the flying object 109 immediately below it to detect the launch of the flying object 109.

Illustration of the ground system 130 is omitted in the drawing.

The position of each surveillance satellite 120 at each time is known to the ground system 130.

The first surveillance satellite 120A monitors the earth's limb on which the flying object 109 is flying from a first latitude at the time of interest while orbiting around the earth. The first latitude is a latitude in the range of from minus 10 degrees to plus 10 degrees. That is, the first surveillance satellite 120A performs limb observation from above the equator to monitor the flying object 109. This results in first monitoring data. The first monitoring data is monitoring data acquired by the first surveillance satellite 120A.

The first surveillance satellite 120A acquires the first monitoring data and transmits the first monitoring data to the ground system 130.

The second surveillance satellite 120B monitors the earth's limb at the time of interest from a second latitude while orbiting around the earth. The second latitude is a latitude in the range of from plus 20 degrees to plus 40 degrees. That is, the second surveillance satellite 120B performs limb observation from a middle latitude zone to monitor the flying object 109. This results in second monitoring data. The second monitoring data is monitoring data acquired by the second surveillance satellite 120B.

The second surveillance satellite 120B acquires the second monitoring data and transmits the second monitoring data to the ground system 130.

The third surveillance satellite 120C monitors the earth's limb at the time of interest from a third latitude while orbiting around the earth. The third latitude is a latitude in the range of from plus 40 degrees to plus 60 degrees. For example, the third surveillance satellite 120C orbits around the earth by flying in an inclined orbit. The third latitude is a latitude at the northern extremity portion of the inclined orbit. That is, the third surveillance satellite 120C performs (backward) limb observation from around the northern extremity of the orbital plane to monitor the flying object 109. This results in third monitoring data. The third monitoring data is monitoring data acquired by the third surveillance satellite 120C.

The third surveillance satellite 120C acquires the third monitoring data and transmits the third monitoring data to the ground system 130.

The ground system 130 operates in the following manner.

First, the ground system 130 receives the first monitoring data, the second monitoring data, and the third monitoring data.

Next, the ground system 130 calculates a first line-of-sight direction based on the first monitoring data. The first line-of-sight direction is the line-of-sight direction from the first surveillance satellite 120A to the flying object 109 at the time of interest.

Further, the ground system 130 calculates a second line-of-sight direction based on the second monitoring data. The second line-of-sight direction is the line-of-sight direction from the second surveillance satellite 120B to the flying object 109 at the time of interest.

Furthermore, the ground system 130 calculates a third line-of-sight direction based on the third monitoring data. The third line-of-sight direction is the line-of-sight direction from the third surveillance satellite 120C to the flying object 109 at the time of interest.

Then, the ground system 130 calculates the flying object coordinate values at the time of interest based on the first line-of-sight direction, the second line-of-sight direction, and the third line-of-sight direction. The flying object coordinate values are coordinate values indicating the position of the flying object 109.

The flying object coordinate values are calculated in the following manner.

First, the ground system 130 calculates a first straight line. The first straight line is a straight line running in the first line-of-sight direction. That is, the first straight line is a straight line that passes through the first surveillance satellite 120A and has the same slope as the first line-of-sight direction.

Further, the ground system 130 calculates a second straight line. The second straight line is a straight line running in the second line-of-sight direction. That is, the second straight line is a straight line that passes through the second surveillance satellite 120B and has the same slope as the second line-of-sight direction.

Furthermore, the ground system 130 calculates a third straight line. The third straight line is a straight line running in the third line-of-sight direction. That is, the third straight line is a straight line that passes through the third surveillance satellite 120C and has the same slope as the third line-of-sight direction.

Then, the ground system 130 calculates the coordinate values of the intersection point of the first straight line, the second straight line, and the third straight line. The calculated coordinate values are the flying object coordinate values.

When the intersection point of the first straight line, the second straight line, and the third straight line cannot be determined, the flying object coordinate values are calculated in the following manner.

First, the ground system 130 calculates a sphere to which the first straight line, the second straight line, and the third straight line are tangent.

Then, the ground system 130 calculates the coordinate values of the center of the calculated sphere. The calculated coordinate values are the flying object coordinate values.

Features and Effects of Embodiment 1

The position coordinates (coordinate values) of the flying object 109 can be analyzed as the point at which the respective line-of-sight vectors of surveillance satellites 120 meet based on the azimuths (line-of-sight direction) of the line-of-sight vectors of the surveillance satellites 120 when the flying object 109 is monitored simultaneously from three surveillance satellites 120 with known position coordinates.

The more distributed the azimuths of the line-of-sight vectors are as seen from the flying object 109, the better the accuracy of position measurement will be. Accordingly, if the flying object 109 flies in the east-west direction from a launching area at a middle latitude, position coordinates analysis of high accuracy becomes possible by monitoring it from three points: a low latitude zone nearly above the equator, a middle latitude zone at a higher latitude than the low latitude zone, and a high latitude zone at a high latitude as much as possible.

It is conceivable that the satellite constellation 110 for monitoring the flying object 109 consists of an equatorial satellite, an inclined orbit satellite, a polar orbit satellite, and the like. An equatorial satellite is a surveillance satellite 120 that orbits above the equator. An inclined orbit satellite is a surveillance satellite 120 that orbits in an inclined orbit. A polar orbit satellite is a surveillance satellite 120 that orbits in a polar orbit. In a low latitude zone nearly above the equator, an equatorial satellite or an inclined orbit satellite when flying nearly above the equator corresponds to the first surveillance satellite 120A. If a polar orbit satellite is included in the satellite constellation 110, monitoring from a high latitude may be performed by the polar orbit satellite. However, if the satellite constellation 110 consists only of inclined orbit satellites, it is rational to perform monitoring near the northern extremities of their inclined orbits.

With Embodiment 1, the position coordinates of a flying object 109 that is launched in a middle latitude zone and flies in the east-west direction can be derived with high accuracy.

It is possible that an analysis result that line-of-sight vectors in three directions which should otherwise meet at a single point do not meet due to errors in the position coordinates of the respective surveillance satellites 120 and errors in the azimuths of the line-of-sight vectors is obtained.

Even if the line-of-sight vectors in three directions do not meet, assuming a sphere having a finite radius allows the position coordinates of the flying object 109 to be derived as the center position coordinates of the sphere with the smallest radius to which the line-of-sight vectors in three directions are tangent.

Embodiment 2

The flying object tracking system 101 will be described based on FIG. 4 primarily for differences from Embodiment 1.

Description of Configuration

The configuration of the flying object tracking system 101 is the same as the configuration in Embodiment 1.

Description of Operation

Figure 4:
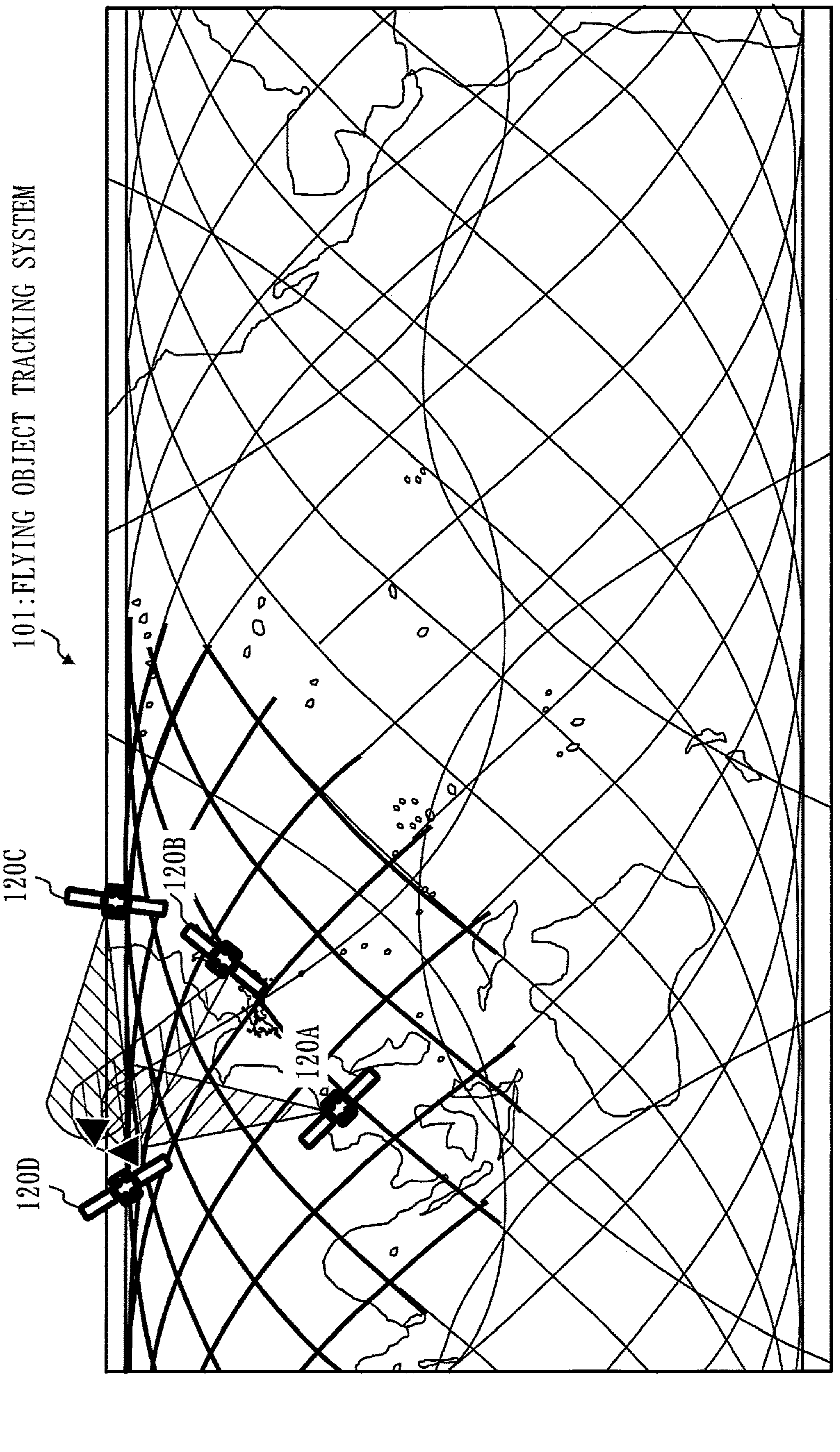
FIG. 4 shows monitoring by the flying object tracking system 101 in Embodiment 2.

Based on FIG. 4, a flight position derivation method is described. The first surveillance satellite 120A monitors the earth's limb on which the flying object 109 is flying from the first latitude at the time of interest while orbiting around the earth. The first latitude is a latitude in the range of from plus 20 degrees to plus 40 degrees. That is, the first surveillance satellite 120A monitors the flying object 109 by performing limb observation from a middle latitude zone. This results in the first monitoring data.

The first surveillance satellite 120A acquires the first monitoring data and transmits the first monitoring data to the ground system 130.

The second surveillance satellite 120B monitors the earth's limb at the time of interest from the second latitude while orbiting around the earth. The second latitude is a latitude in the range of from plus 30 degrees to plus 50 degrees. That is, the second surveillance satellite 120B monitors the flying object 109 by performing limb observation from a middle to high latitude zone. This results in the second monitoring data.

The second surveillance satellite 120B acquires the second monitoring data and transmits the second monitoring data to the ground system 130.

The third surveillance satellite 120C monitors the earth's limb at the time of interest from the third latitude while orbiting around the earth. The third latitude is a latitude of plus 50 degrees or higher. That is, the third surveillance satellite 120C monitors the flying object 109 by performing (backward) limb observation from a high latitude zone. This results in the third monitoring data.

The third surveillance satellite 120C acquires the third monitoring data and transmits the third monitoring data to the ground system 130.

The operation of the ground system 130 is the same as the operation in Embodiment 1.

Features and Effects of Embodiment 2

A flying object 109 that is launched from a high latitude zone will deviate from the range of field of view from nearly above the equator. Accordingly, the flying object 109 needs to be monitored by an inclined orbit satellite or a polar orbit satellite.

With Embodiment 2, the position coordinates of a flying object 109 that is launched from a high latitude zone including a polar zone and flies through a polar zone can be derived with high accuracy.

Embodiment 3

A flying object handling system 102 will be described based on FIG. 5 primarily for differences from Embodiment 1 and Embodiment 2.

Description of Configuration

Figure 5:
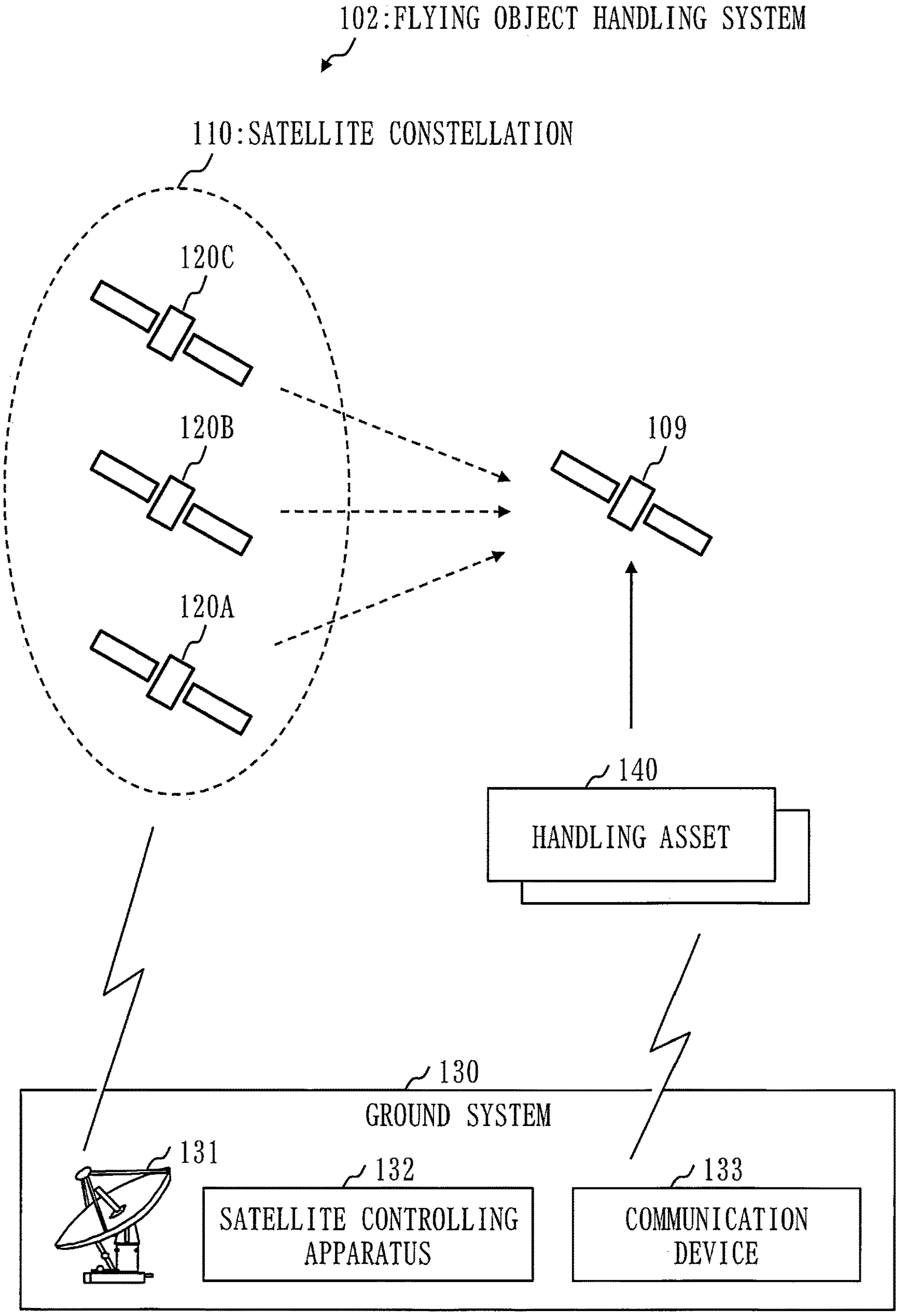
FIG. 5 is a configuration diagram of a flying object handling system 102 in Embodiment 3.

Based on FIG. 5, the configuration of the flying object handling system 102 is described. The flying object handling system 102 is an example of the flying object tracking system 101.

The flying object handling system 102 is a system for tracking the flight trajectory of a flying object 109 and handling the flying object 109.

The flying object handling system 102 includes the satellite constellation 110, the ground system 130, and multiple handling assets 140.

The multiple handling assets 140 are disposed at different locations from each other in order to handle a flying object 109. Specific examples of the handling assets 140 include airplanes, ships, or vehicles.

The ground system 130 includes the communication device 131, the satellite controlling apparatus 132, and a communication device 133.

The communication device 133 is a device for communicating with each handling asset 140.

Description of Operation

The operation of the satellite constellation 110 is the same as the operation in Embodiment 1 or Embodiment 2.

First, the ground system 130 calculates flying object coordinate values at each time. The way of calculation is the same as that in Embodiment 1.

Next, the ground system 130 selects one or more handling assets 140 from the multiple handling assets 140 based on the flying object coordinate values at each time. For example, the ground system 130 predicts the destination of the flying object 109 and selects the handling asset 140 that is closest to the predicted destination.

The ground system 130 then generates flying object information data and transmits the flying object information data to each of the selected one or more handling assets 140.

The flying object information data indicates information on the flying object 109. For example, flying object information data indicates the flying object coordinate values at each time.

Effects of Embodiment 3

With Embodiment 3, it becomes possible to track the flying object 109, select handling assets 140, and handle the flying object 109.

Embodiment 4

A flying object tracking system 103 will be described based on FIGS. 6 to 9 primarily for differences from Embodiment 1 or Embodiment 2.

Description of Configuration

Figure 6:
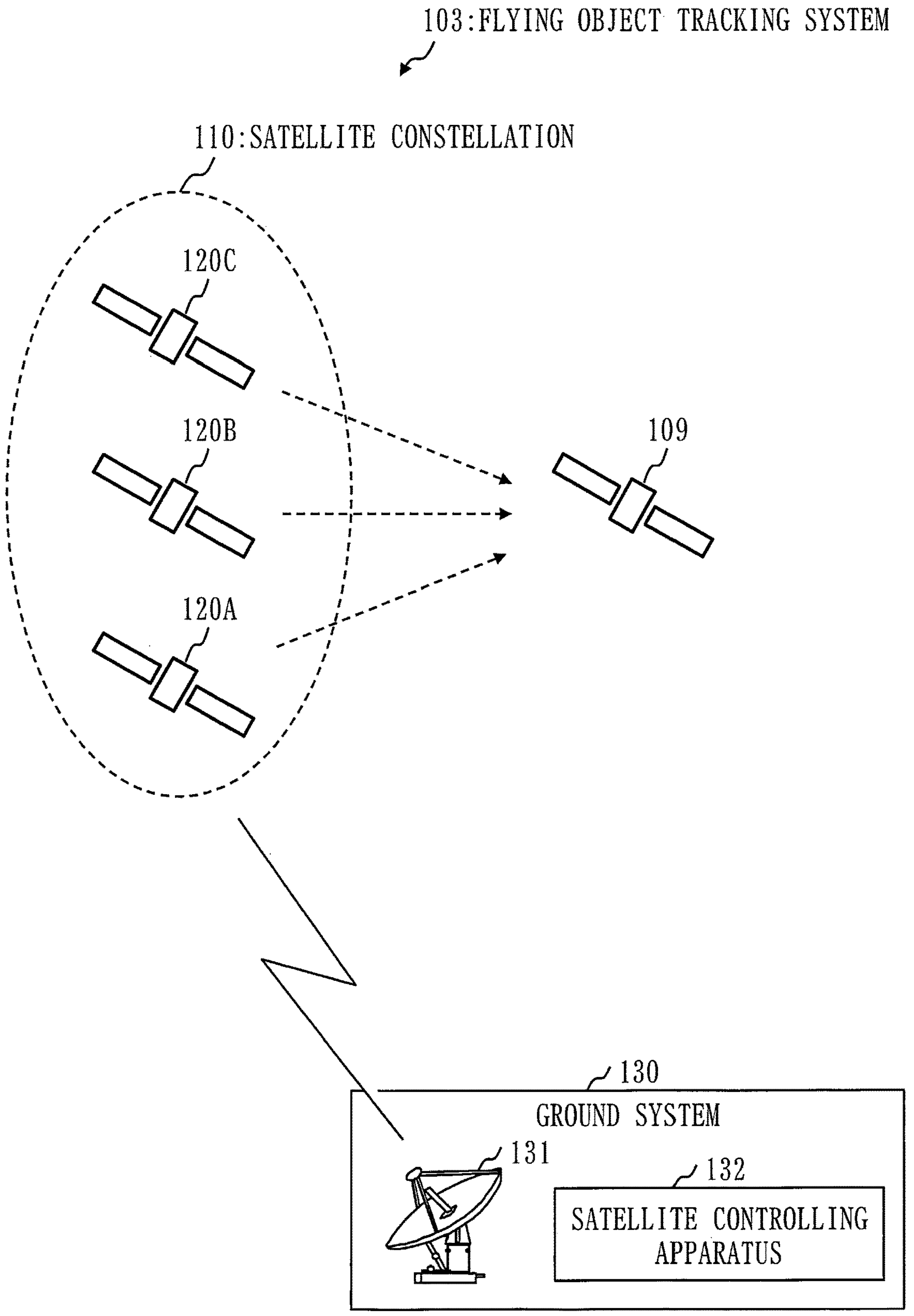
FIG. 6 is a configuration diagram of a flying object tracking system 103 in Embodiment 4.

Based on FIG. 6, a configuration of the flying object tracking system 103 is described.

The flying object tracking system 103 is a system for tracking the flight trajectory of a flying object 109.

The flying object tracking system 103 includes the satellite constellation 110 and the ground system 130.

The satellite constellation 110 includes multiple surveillance satellites 120. The first surveillance satellite 120A, the second surveillance satellite 120B, and the third surveillance satellite 120C are each an example of the surveillance satellites 120 included in the flying object tracking system 103.

The satellite controlling apparatus 132 stores multiple flight path models. The flight path models represent predicted flight paths of the flying object 109. For example, the flight path models represent coordinate values indicating the launch point of the flying object 109 (launch point coordinate values). The flight path models also represent the flying direction of the flying object 109. The flight path models further indicate a flight distance and a flight altitude at each time after the launch. Each time after the launch is indicated by the time that has elapsed since the launch.

Description of Operation

The multiple surveillance satellites 120 perform monitoring of the flying object 109 at the time of interest from different positions than each other to acquire multiple sets of monitoring data, and transmit the multiple sets of monitoring data.

The ground system 130 operates in the following manner.

First, the ground system 130 receives the multiple sets of monitoring data.

Next, the ground system 130 selects one flight path model from the multiple flight path models based on the multiple sets of monitoring data.

The ground system 130 then calculates the flying object coordinate values at the time of interest based on the selected flight path model.

Supplementary Note on Embodiment 4

The ground system 130 models the flight path of the flying object 109. The flight path model is formed of the launch location coordinates of the flying object 109 (launch point coordinate value), the flying direction of the flying object 109, and time-series profile from the launch to the landing (flight distance and flight altitude).

The ground system 130 chooses a provisional flight path model (for prediction) from the multiple flight path models, with the launch point of the flying object 109 detected by the infrared monitoring device as a starting point.

The ground system 130 derives position coordinates that minimize the discrepancy between the line-of-sight vector from the surveillance satellite 120 to the flying object 109 at the time of interest and the flight position coordinates at the time of interest with the provisional flight path model as updated flight position coordinates.

Figure 7:
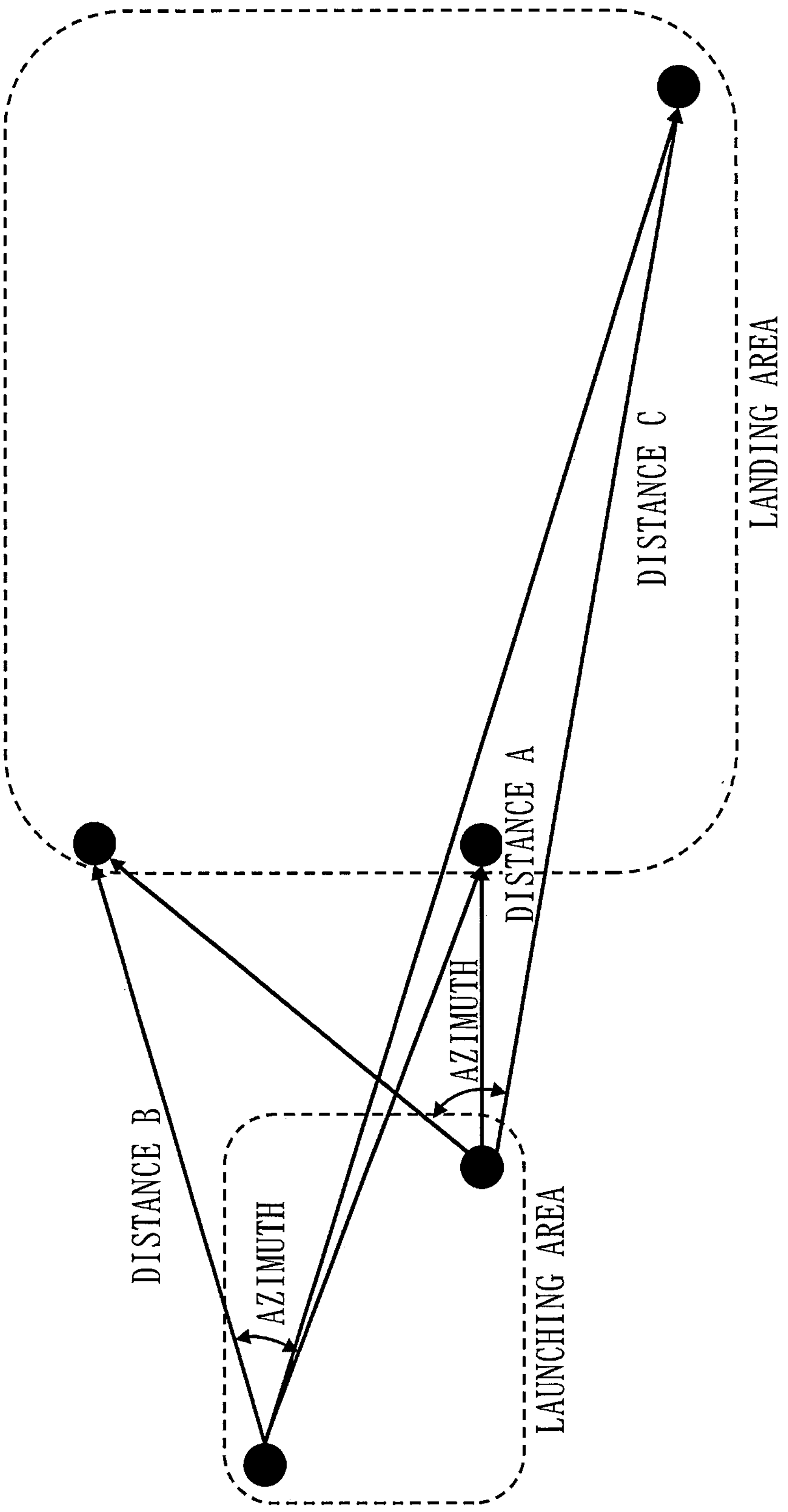
FIG. 7 shows three patterns of distances (A, B, C) in Embodiment 4.

FIG. 7 shows three patterns of distances (A, B, C) from the launch of the flying object 109 to its landing. The black circles represent the flying object 109.

The flying object 109 is launched from a location within a launching area and lands at a location within a landing area.

Figure 8:
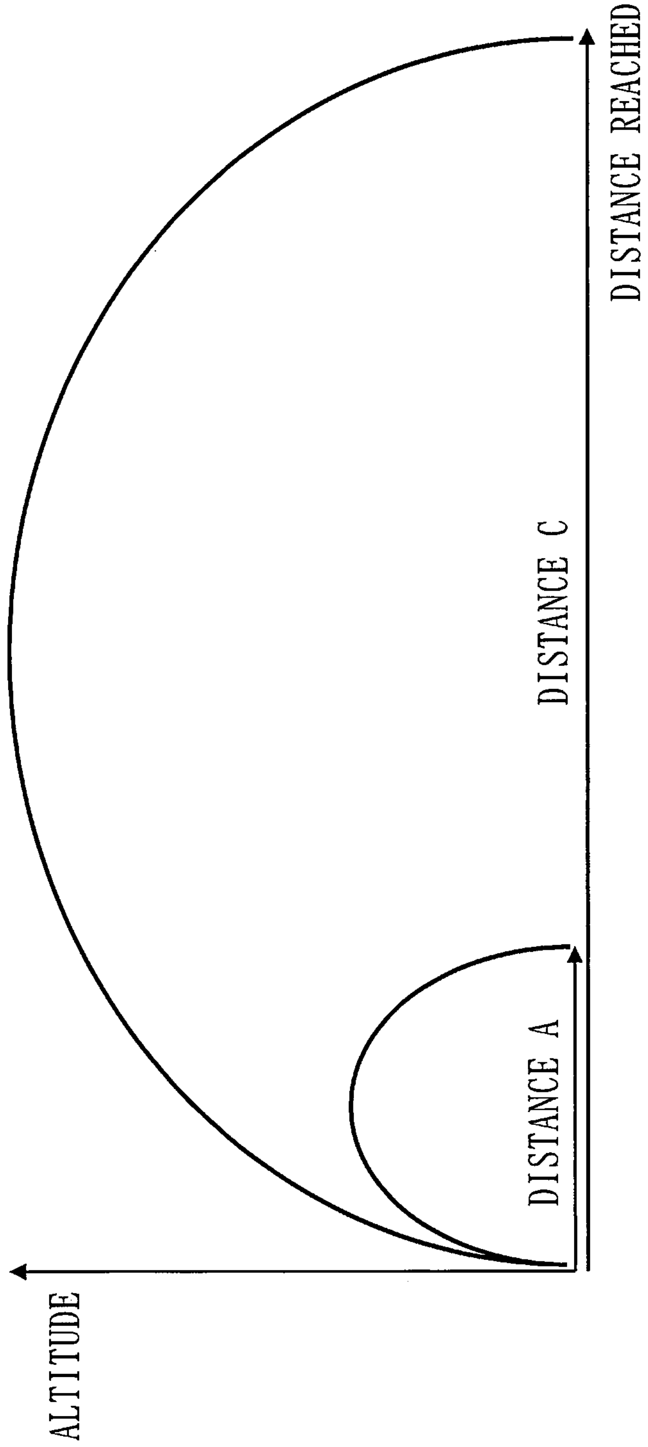
FIG. 8 shows two flight path models (ballistic flight) in Embodiment 4.

FIG. 8 represents two flight path models for a case where the flying object 109 undergoes a ballistic flight. Each flight path model indicates the relationship between the distance and the altitude. The distance reached by the flying object 109 in one flight path model is distance A, and the distance reached by the flying object 109 in the other flight path model is distance C.

Figure 9:
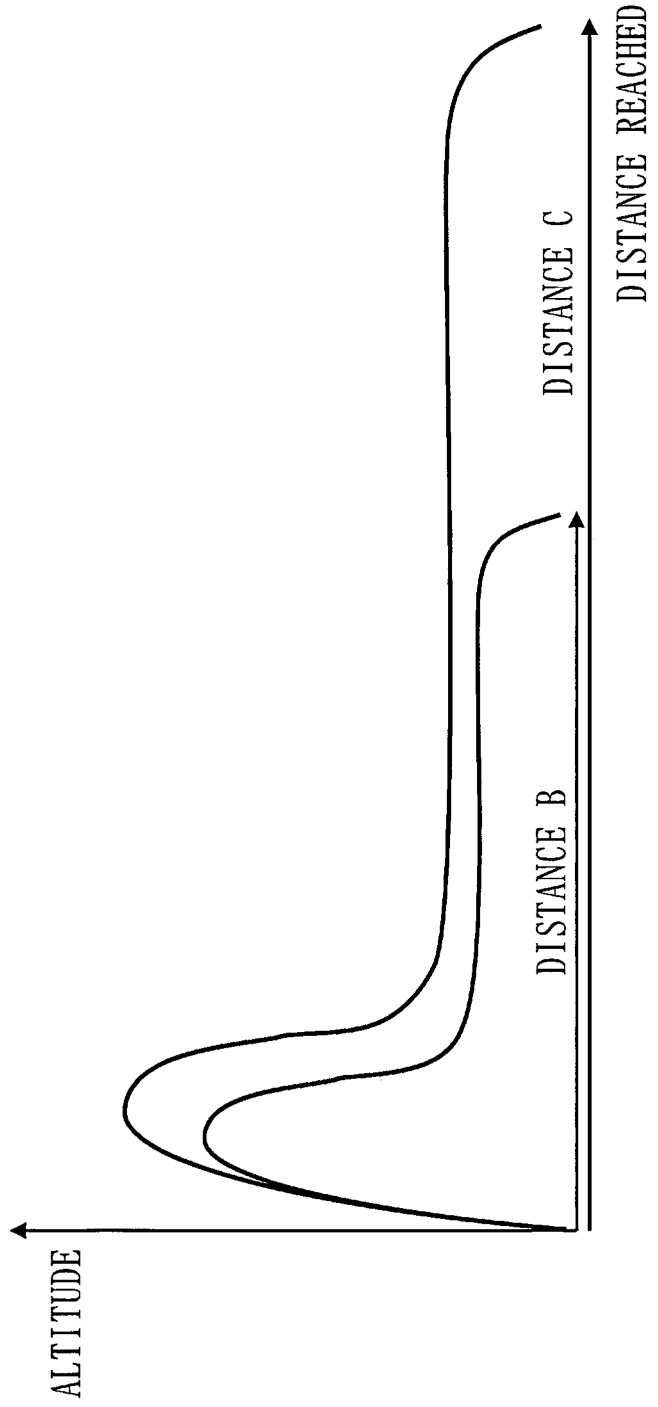
FIG. 9 shows two flight path models (intermittent injection) in Embodiment 4.

FIG. 9 represents two flight path models for a case where the flying object 109 is intermittently injected. Each flight path model indicates the relationship between the distance and the altitude. The distance reached by the flying object 109 in one flight path model is distance B, and the distance reached by the flying object 109 in the other flight path model is distance C.

Features and Effects of Embodiment 4

It is possible that an analysis result that the line-of-sight vectors in three directions which should otherwise meet at a single point do not meet due to errors in the position coordinates of the respective surveillance satellites 120 and errors in the azimuths of the line-of-sight vectors is obtained. Even in such a case, Embodiment 4 allows derivation of the position coordinates of the flying object 109.

Flight path models assuming typical flight profiles of the flying object 109 are prepared in advance. The ground system 130 selects a flight path model based on launch detection information obtained by the surveillance satellite 120. Specifically, the ground system 130 selects a flight path model that is consistent with monitoring results from a subsequent satellite with the launch location coordinates of the flying object 109 as a starting point. Next, the ground system 130 corrects the discrepancy between the selected flight path model and the actual trajectory of the flying object 109 based on measurement information from the subsequent satellite. Then, the ground system 130 derives flight position coordinates of high accuracy.

When the flying object 109 undergoes a ballistic flight, its flight profile is formed in a vertical plane including the launch location coordinates. It is also presupposed that the flying object 109 is located at the intersection point of the line-of-sight vector at the time of monitoring the flying object 109 by the subsequent satellite and the vertical plane. This reveals discrepancies due to an error in the azimuth of flight path model, an error in the profile, an analytic error in the position coordinates of the surveillance satellites 120, and an analytic error in the azimuth of each line-of-sight vector.

By ensuring consistency with flight information obtained by further subsequent satellites, the amount of mutual error can be reduced and flight position coordinates of high accuracy can be derived.

In a case where the flying object 109 intermittently repeats injection, the flight path of the flying object 109 will be more complicated than when the flying object 109 undergoes a ballistic flight. However, by repeating acquisition of flight information by subsequent satellites, the elapsed time from the launch of the flying object 109 becomes longer and the flight distance of the flying object 109 increases. In turn, the estimation accuracy of the azimuth becomes better and the amount of error contained in the flight path models is reduced.

Even if the flying object 109 is intermittently injected, its altitude or horizontal movement distance immediately after the injection is small compared to the flight distance, which is a long distance. Thus, by repeating acquisition of flight information by subsequent satellites, position coordinates of high accuracy can be derived even if the flying object 109 is intermittently injected.

According to Embodiment 4, the position coordinates of the flying object 109 can be derived without using multiple sets of monitoring data acquired by multiple surveillance satellites 120 at the same time. Specifically, the position coordinates can be derived based on a flight path model depending on the elapsed time from the launch of the flying object 109. Thus, the degree of freedom in acquisition of monitoring data by subsequent satellites is high and monitoring data is easily collected.

Needless to say, by performing monitoring from many directions with different azimuths of line-of-sight vectors and collecting monitoring data, derivation of an accurate flight position becomes possible.

Embodiment 5

A flying object handling system 104 will be described based on FIG. 10 primarily for differences from Embodiment 1 to Embodiment 4.

Description of Configuration

Figure 10:
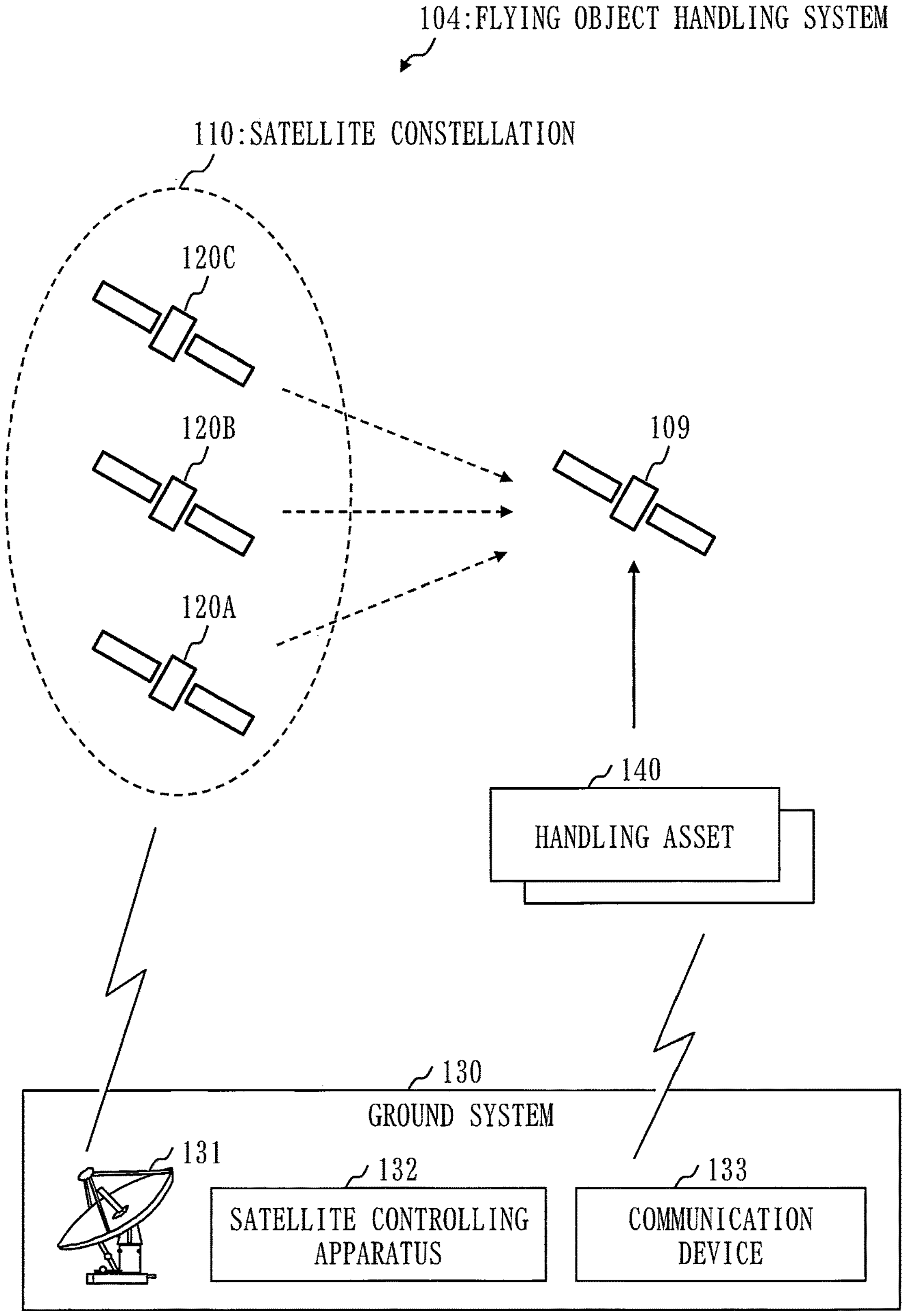
FIG. 10 is a configuration diagram of a flying object handling system 104 in Embodiment 5.

Based on FIG. 10, the configuration of the flying object handling system 104 is described. The flying object handling system 104 is an example of the flying object tracking system 103.

The flying object handling system 104 is a system for tracking the flight trajectory of a flying object 109 and handling the flying object 109.

The flying object handling system 104 includes the satellite constellation 110 and the ground system 130 as with the configuration in Embodiment 4.

The flying object handling system 104 includes multiple handling assets 140 as with the configuration in Embodiment 3.

The ground system 130 includes the communication device 133 as with the configuration in Embodiment 3.

Description of Operation

The operation of the satellite constellation 110 is the same as the operation in Embodiment 4.

The ground system 130 calculates the flying object coordinate values at each time in the same manner as that in Embodiment 4.

The ground system 130 selects a handling asset 140 in the same manner as that in Embodiment 3 and transmits flying object information data to the selected handling asset 140.

Effects of Embodiment 5

With Embodiment 5, it becomes possible to track the flying object 109, select handling assets 140, and handle the flying object 109.

Supplementary Note on Embodiments

Upon launching of a flying object, monitoring can be easily performed because hot atmosphere spreads. However, a flying object body in a post-boost phase has a small solid angle visible from surveillance satellites and temperature rise is not as conspicuous as plume. Consequently, if information on a land region as background is contained in flying object information, it can make identification of the flying object impossible. The post-boost phase is a phase after cease of injection.

Thus, the flying object body at elevated temperature is monitored against deep space as background by a monitoring method called limb observation, which is orientated to the earth's limb.

This enables monitoring of the flying object without flying object information being buried in noise.

The satellite controlling apparatus functions as a flight path prediction device that combines flying object information indicating hot objects detected by multiple surveillance satellites and analyzes chronological change in position information. This enables tracking of a flying object and prediction of its flight path.

Even if the flying object is intermittently re-injected and changes its direction of travel during flight, the flight path prediction device tracks the direction of travel and continuously acquires time-series information, thus enabling handling of the flying object.

As handling assets, there are aircrafts, ships, and vehicles deployed on lands, seas, and skies. Aside from them, ground installed facilities and the like are also present.

There are also means for transmitting information directly to individual handling assets. However, there are cases where position information for individual handling assets cannot be disclosed such as due to security-related limitation. So, if the flying object handling system employs a special dedicated system, it would be rational to aggregate commands for handling assets and flying object information at a handling ground center (ground system) and give commands from the handling ground center to the handling assets.

How the flying object handling system is operated varies with how the entire system is configured and operated.

The embodiments are illustrative of preferred forms and are not intended to limit the technical scope of the present disclosure. The embodiments may be partially practiced or in combination with other forms.

REFERENCE SIGNS LIST

101: flying object tracking system; 102: flying object handling system; 103: flying object tracking system; 104: flying object handling system; 109: flying object; 110: satellite constellation; 120: surveillance satellite; 120A: first surveillance satellite; 120B: second surveillance satellite; 120C: third surveillance satellite; 121: communication device; 122: monitoring device; 123: propulsion device; 124: attitude control device; 125: satellite control device; 126: power supply device; 130: ground system; 131: communication device; 132: satellite controlling apparatus; 133: communication device; 140: handling asset

The invention claimed is:

1. A flight position derivation method for deriving a position of a flying object that intermittently repeats injection, comprising:

monitoring, by a first surveillance satellite, an earth's limb on which the flying object is flying from a first latitude at a time of interest while orbiting around the earth to acquire first monitoring data, and transmitting the first monitoring data;

monitoring, by a second surveillance satellite, the earth's limb at the time of interest from a second latitude while orbiting around the earth to acquire second monitoring data, and transmitting the second monitoring data;

monitoring, by a third surveillance satellite, the earth's limb at the time of interest from a third latitude while orbiting around the earth to acquire third monitoring data, and transmitting the third monitoring data;

receiving, by a ground system, the first monitoring data, the second monitoring data, and the third monitoring data;

calculating, by the ground system, a first line-of-sight direction from the first surveillance satellite to the flying object at the time of interest based on the first monitoring data, calculating a second line-of-sight direction from the second surveillance satellite to the flying object at the time of interest based on the second monitoring data, and calculating a third line-of-sight direction from the third surveillance satellite to the flying object at the time of interest based on the third monitoring data;

calculating flying object coordinate values indicating a position of the flying object at the time of interest based on the first line-of-sight direction, the second line-of-sight direction, and the third line-of-sight direction;

calculating, by the ground system, coordinate values of an intersection point of a first straight line running in the first line-of-sight direction, a second straight line running in the second line-of-sight direction, and a third straight line running in the third line-of-sight direction, as the flying object coordinate values; and when the intersection point cannot be determined, the method further comprises calculating, by the ground system, a sphere to which the first straight line, the second straight line, and the third straight line are tangent, and calculating coordinate values of a center of the calculated sphere as the flying object coordinate values.

2. The flight position derivation method according to claim 1, wherein the first latitude is a latitude in a range of from minus 10 degrees to plus 10 degrees, the second latitude is a latitude in a range of from plus 20 degrees to plus 40 degrees, and the third latitude is a latitude in a range of from plus 40 degrees to plus 60 degrees.

3. The flight position derivation method according to claim 2, wherein the third surveillance satellite orbits around the earth by flying in an inclined orbit, and the third latitude is a latitude at a northern extremity portion of the inclined orbit.

4. The flight position derivation method according to claim 1, wherein the first latitude is a latitude in a range of from plus 20 degrees to plus 40 degrees, the second latitude is a latitude in a range of from plus 30 degrees to plus 50 degrees, and the third latitude is a latitude of plus 50 degrees or higher.

5. A flying object tracking system comprising:

a satellite constellation including a first surveillance satellite, a second surveillance satellite, and a third surveillance satellite; and a ground system, wherein the first surveillance satellite, the second surveillance satellite, the third surveillance satellite, and the ground system together perform the method according to claim 1.

6. A flying object handling system comprising:

a satellite constellation including a first surveillance satellite, a second surveillance satellite, and a third surveillance satellite;

a ground system, the first surveillance satellite, the second surveillance satellite, the third surveillance satellite, and the ground system together perform the method according to claim 1; and a plurality of handling assets disposed at different locations from each other in order to handle a flying object, wherein the ground system calculates flying object coordinate values indicating a position of the flying object at each time, selects one or more handling assets from the plurality of handling assets based on the flying object coordinate values at each time, and transmits flying object information data indicating information on the flying object to each one of the selected one or more handling assets.

7. A flight position derivation method for deriving a position of a flying object that intermittently repeats injection, comprising:

performing monitoring, by a plurality of surveillance satellites, of the flying object at a time of interest from different positions than each other to acquire a plurality of sets of monitoring data, and transmitting the plurality of sets of monitoring data, receiving, by a ground system, the plurality of sets of monitoring data, selecting one flight path model based on the plurality of sets of monitoring data from a plurality of flight path models each representing a predicted flight path of the flying object, and calculating coordinate values of a position that minimizes discrepancy between a line-of-sight vector from a surveillance satellite of the plurality of surveillance satellites to the flying object at the time of interest and a position of the flying object at the time of interest with the selected flight path model as flying object coordinate values indicating a position of the flying object at the time of interest, wherein calculating the coordinate values includes calculating a sphere to which a first straight line, a second straight line, and a third straight line are tangent, and calculating coordinate values of a center of the calculated sphere as the coordinate values, the first straight line corresponding to the line-of-sight vector of the surveillance satellite, the second straight line corresponding to a line-of-sight vector of another surveillance satellite of the plurality of surveillance satellites, and the third straight line corresponding to a line-of-sight vector of a further surveillance satellite of the plurality of surveillance satellites.

8. A flying object tracking system comprising:

a satellite constellation including a plurality of surveillance satellites; and a ground system, wherein the plurality of surveillance satellites and the ground system together perform the method according to claim 7.

9. A flying object handling system comprising:

a satellite constellation including a plurality of surveillance satellites;

a ground system, the plurality of surveillance satellites and the ground system together performing the method according to claim 7; and a plurality of handling assets disposed at different locations from each other in order to handle a flying object, wherein the ground system calculates flying object coordinate values indicating a position of the flying object at each time, selects one or more handling assets from the plurality of handling assets based on the flying object coordinate values at each time, and transmits flying object information data indicating information on the flying object to each one of the selected one or more handling assets.

10. The flight position derivation method according to claim 1, wherein the flying object is a hypersonic glide vehicle (HGV).

11. The flight position derivation method according to claim 1 wherein at least one of the first, second, and third monitoring data is generated by an infrared monitoring device on a corresponding one of the first, second, and third surveillance satellites.

12. The flight position derivation method according to claim 1, wherein each of the first, second, and third surveillance satellites are low earth orbit (LEO) satellites.

* * * * *